No. 745,100. PATENTED NOV. 24, 1903.
H. FORBUSH.
TRAINING DEVICE FOR PENMANSHIP PRACTICE.
APPLICATION FILED SEPT. 5, 1903.
NO MODEL.
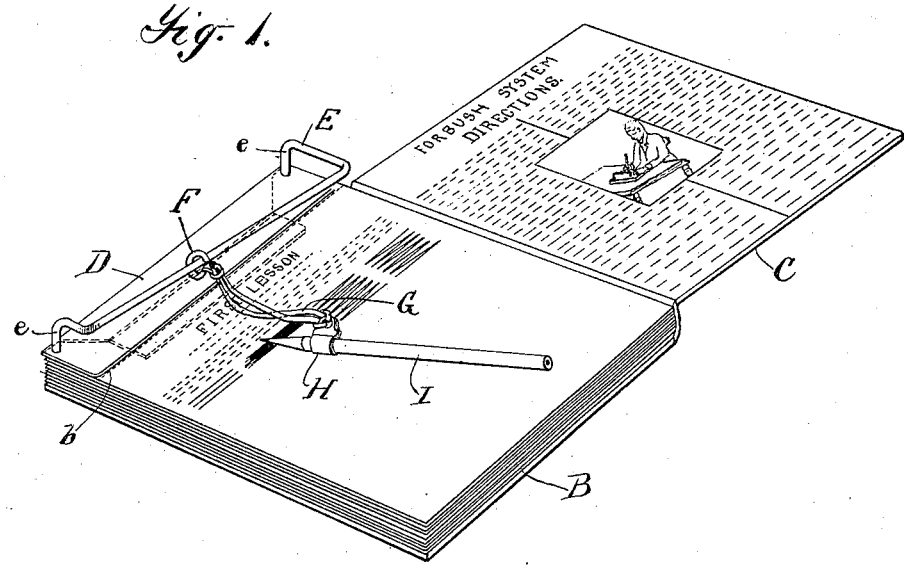
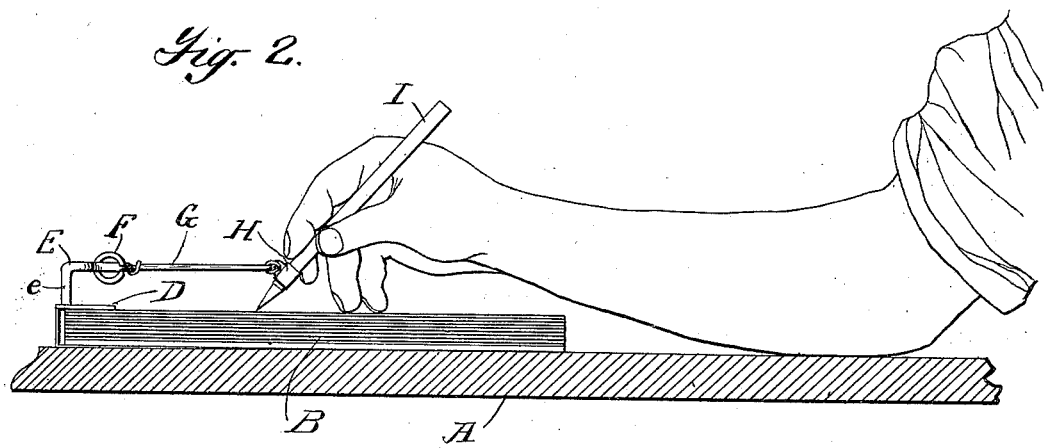

No. 745,100. Patented November 24, 1903.

UNITED STATES PATENT OFFICE.

HORACE FORBUSH, OF BOSTON, MASSACHUSETTS.

TRAINING DEVICE FOR PENMANSHIP PRACTICE.

SPECIFICATION forming part of Letters Patent No. 745,100, dated November 24, 1903.

Application filed September 5, 1903. Serial No. 172,035. (No model.)

*To all whom it may concern:*

Be it known that I, HORACE FORBUSH, a citizen of the United States, residing at Boston, county of Suffolk, and State of Massachusetts, have invented certain new and useful Improvements in Training Devices for Penmanship Practice, fully described and represented in the following specification and the accompanying drawings, forming a part of the same.

This invention relates to improvements in devices for use in teaching penmanship. The correct methods of teaching penmanship at the present time are those under which the pupil acquires a correct position of the body as well as a free and graceful movement of the forearm as distinguished from the incorrect position of the body and the limited and cramped movements of the wrist and fingers which are characteristic of the first attempts of untaught persons, children, or adults to learn to write. In teaching penmanship according to these correct methods it is always difficult and in many cases impossible to cause the pupil by mere verbal directions or instructions to acquire this free movement of the forearm, as the tendency of persons learning to write is, as before stated, to adopt the faulty cramped movements of the wrist and fingers which it is difficult to correct and which necessitates constant watching and direction on the part of the teacher.

It is the object of the present invention to overcome this difficulty and to provide a device for use in teaching penmanship according to these correct methods and so training the hand, wrist, and forearm of the pupil that at the outset he will acquire and thereafter retain and rely upon the free and graceful movement of the forearm necessary to perfect penmanship according to the correct methods of teaching the same.

As a full understanding of the improvements of the present invention can best be had from a detailed description of an organization embodying the same, such description will now be given in connection with the accompanying drawings, in which—

Figure 1 is a perspective view of a writing-pad equipped with the training device of the present invention; and Fig. 2 is a side view of the same, illustrating the pad upon a table or writing-desk and the training device in use by the pupil.

Referring to said drawings, A represents a table or desk, and B a pad of writing-paper provided with the training device of the present invention. One cover C of the pad is hinged to the right-hand side of the pad and may bear on its inner face directions as to exercises and the manner in which the training device is to used, which when the cover C is opened, as indicated in Fig. 1, are exposed so that they may be conveniently read by the pupil. The sheets of the pad B may contain head-notes setting forth the different lessons or exercises to be followed by the pupil, which lessons or exercises are arranged in regular order upon the several sheets with a single lesson on a sheet, as indicated in Fig. 1, where the first sheet is shown as containing the "First lesson." The several sheets of the pad B are also perforated on the line $b$, so that as a sheet is used up it may be readily removed, thus exposing the next sheet, which may contain a duplicate of the lesson or exercise on the sheet removed or a different lesson or exercise.

The training device shown comprises a base or support D, adapted to be detachably connected at the top edge of the pad, this base or support for the purpose of so connecting it with the pad B being preferably made of some suitable sheet metal bent to the shape shown, so as to fit over and tightly clamp the top edge of the pad, from which it is readily removable, so that it may be applied to a fresh pad after the first one has been used up. The base D is provided with a guide E in the form of a rod, and the latter in turn is provided with a slide F, preferably in the form of a ring, which is adapted to slide freely back and forth on the rod E, according as the hand of the pupil is moved back and forth over the surface of the pad B in performing the exercises. To provide for free movement of the ring F, the guide E is connected with the base D by downwardly-projecting portions $e$, which support the rod E at some distance above the base D, so that the ring F may move on the rod E without interference by the base D. The ring F is provided with resilient or elastic means, as a rubber band G, for connecting it with a socket H for receiving a writing implement I, which is preferably a pencil.

In use the pencil I is held by the pupil between the thumb and second and third fingers of his hand, as illustrated in Fig. 2. In writing or performing the different exercises, which take in all the movements or lines, curved or straight, used in the formation of written characters, the pupil after taking hold of the pencil in the proper manner will rest the fleshy part of his forearm upon the table or desk A and rest the fourth and fifth fingers of his hand lightly upon the pad after the manner illustrated in Fig. 2, the position of the hand relatively to the guide E being such, as also indicated in Fig. 2, that when the pupil's hand is in writing position the band G will be under slight tension. Throughout the performance of the several writing exercises provided for the pupil the band G will be kept by him under tension, the characters being formed entirely by movement of the forearm to and from the guide E or top of the pad and also back and forth across the face of the pad, the fleshy part of the forearm resting upon the table A and serving as the support or fulcrum for the forearm during such movements.

The purpose of the present invention, as before indicated, is to provide a device which will so train the pupil in writing that he will rely upon movement of the forearm in performing his exercises instead of movements of the wrist or fingers. This result is realized by the training device of the present invention, in the use of which the elastic band G is kept under tension throughout the writing exercise, thereby offering a slight resistance to movement of the forearm and bringing into play the larger muscles of the forearm in overcoming this resistance.

It is of great importance that the ring or slide F shall travel along the guide E a little in advance of the hand. This is accomplished by arranging the guide-rod E obliquely at a suitable incline, as shown, so that the tendency of the ring or slide F when the tension of the elastic G is released slightly at intervals as the hand of the pupil is moved toward the top part of the pad is to move gradually toward the right-hand end of the guide-rod E, which, as will be observed, gradually approaches the line of writing from right to left. This results in keeping the ring or slide F in its correct relative position in advance of the hand of the pupil through each exercise.

What is claimed is—

1. A device for training the hand and arm in penmanship practice comprising a slide adapted to be connected with a writing implement and to accompany it as it is moved from left to right in writing, and a guide for said slide arranged in an oblique direction so that it will gradually approach the line of writing from left to right, substantially as described.

2. A device for training the hand and arm in penmanship practice comprising a sliding ring adapted to be connected with a writing implement and to accompany it as it is moved from left to right in writing, and a guide-rod for said sliding ring arranged in an oblique direction so that it will gradually approach the line of writing from left to right, substantially as described.

3. A device for training the hand and arm in penmanship practice comprising a slide provided with resilient means for connecting it with a writing implement and adapted to accompany the writing implement as it is moved from left to right in writing, and a guide for said slide arranged in an oblique direction so that it will gradually approach the line of writing from left to right, substantially as described.

4. A device for training the hand and arm in penmanship practice comprising a sliding ring provided with resilient means for connecting it with a writing implement and adapted to accompany the writing implement as it is moved from left to right in writing, and a guide-rod for said ring arranged in an oblique direction so that it will gradually approach the line of writing from left to right, substantially as described.

5. A device for training the hand and arm in penmanship practice comprising a slide adapted to be connected with a writing implement and to accompany it as it is moved from left to right in writing, a suitable support adapted to be detachably connected with a pad of writing material, and a guide for said slide arranged in an oblique direction so that it will gradually approach the line of writing from left to right, substantially as described.

6. A device for training the hand and arm in penmanship practice comprising a slide adapted to be connected with a writing implement and to accompany it as it is moved from left to right in writing, a suitable support adapted to be slipped over and thus detachably connected with the edge of a pad of writing material, and a guide for said slide arranged in an oblique direction so that it will gradually approach the line of writing from left to right, substantially as described.

7. A penmanship-exercise device, comprising a pad of writing material, the sheets whereof contain the writing exercises, and a device for training the hand and arm comprising a suitable support detachably connected with the pad, a slide adapted to be connected with a writing implement and to accompany it as it is moved from left to right in writing, and a guide for said slide arranged in an oblique direction so that it will gradually approach the line of writing from left to right, substantially as described.

8. A penmanship-exercise device, comprising a pad of writing material, the sheets whereof contain the writing exercises, and a device for training the hand and arm comprising a suitable support having means for slipping over and detachably connecting it with the edge of the pad, a slide adapted to be connected with a writing implement and to accompany it as it is moved from left to right in writing, and a guide for said slide arranged in an oblique direction so that it will gradually approach the line of writing from left to right, substantially as described.

In testimony whereof I have hereunto set my hand in the presence of two subscribing witnesses.

HORACE FORBUSH.

Witnesses:
   JAMES B. GARDNER,
   FRANCIS A. GARDNER.